(12) United States Patent
Kirchen

(10) Patent No.: US 7,033,121 B2
(45) Date of Patent: Apr. 25, 2006

(54) WATER-TIGHT GROMMET

(75) Inventor: James T. Kirchen, Chippewa Falls, WI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/633,087

(22) Filed: Aug. 1, 2003

(65) Prior Publication Data
US 2004/0151560 A1 Aug. 5, 2004

Related U.S. Application Data

(60) Provisional application No. 60/414,772, filed on Sep. 30, 2002.

(51) Int. Cl.
F16B 13/06 (2006.01)

(52) U.S. Cl. .................. 411/48; 411/371.1; 411/901; 24/453

(58) Field of Classification Search .............. 411/41, 411/45–46, 48, 338–339, 542, 47, 901, 371.1; 24/297, 453
See application file for complete search history.

(56) References Cited

U.S. PATENT DOCUMENTS

| | | | | |
|---|---|---|---|---|
| 3,519,279 A * | 7/1970 | Wagner | ...................... | 411/542 |
| 4,280,390 A * | 7/1981 | Murray | ...................... | 411/542 |
| 4,431,355 A * | 2/1984 | Junemann | ................... | 411/360 |
| 4,443,145 A * | 4/1984 | Peschges | .................... | 411/542 |
| 5,173,026 A * | 12/1992 | Cordola et al. | ............ | 411/542 |
| 5,211,519 A * | 5/1993 | Saito | .......................... | 411/48 |
| 5,217,337 A * | 6/1993 | Junemann et al. | ........ | 24/297 X |
| 5,387,065 A * | 2/1995 | Sullivan | ...................... | 411/48 |
| 5,507,610 A * | 4/1996 | Benedetti et al. | ........... | 411/339 |
| 5,540,528 A * | 7/1996 | Schmidt et al. | ........... | 411/48 X |
| 5,580,204 A * | 12/1996 | Hultman | ..................... | 411/509 |
| 5,641,255 A * | 6/1997 | Tanaka | ........................ | 411/48 |
| 5,846,039 A * | 12/1998 | Kirchen et al. | ............... | 411/48 |
| 5,846,040 A | 12/1998 | Ueno | .......................... | 411/45 |
| 5,850,676 A * | 12/1998 | Takahashi et al. | ............ | 24/453 |
| 5,857,244 A * | 1/1999 | Edwards et al. | .............. | 24/453 |
| 5,937,486 A * | 8/1999 | Bockenheimer | ............. | 24/297 |
| 6,039,523 A * | 3/2000 | Kraus | .......................... | 411/48 |
| 6,264,393 B1 | 7/2001 | Kraus | ......................... | 403/282 |
| 6,324,731 B1 | 12/2001 | Pliml, Jr. | ..................... | 24/453 |
| 6,406,235 B1 * | 6/2002 | Bantle | ......................... | 411/45 |
| 6,594,870 B1 * | 7/2003 | Lambrecht et al. | .......... | 24/453 |
| 2003/0194288 A1* | 10/2003 | Moerke et al. | ............... | 411/46 |

FOREIGN PATENT DOCUMENTS

| FR | 1.569.334 | 5/1968 |
|---|---|---|
| FR | 2.177.173 | 11/1973 |
| FR | 2 489 899 | 3/1982 |

* cited by examiner

Primary Examiner—Brian E. Glessner
Assistant Examiner—Christopher J. Boswell
(74) Attorney, Agent, or Firm—Paul F. Donovan; Mark W. Croll

(57) ABSTRACT

A substantially watertight grommet having a sealing mechanism that can simultaneously form a watertight seal between the grommet and a pin received therein and between the grommet and a panel within which the grommet is received is herein described. In a preferred embodiment, the sealing mechanism is formed integrally with the head of the grommet by an overmolding process. A body of the grommet has a retention structure for securing the grommet within a bore formed in a panel and a catchment mechanism for securing a pin within the grommet. The catchment mechanism is constructed so as to permit the pin to be secured within the grommet in a plurality of positions.

10 Claims, 1 Drawing Sheet

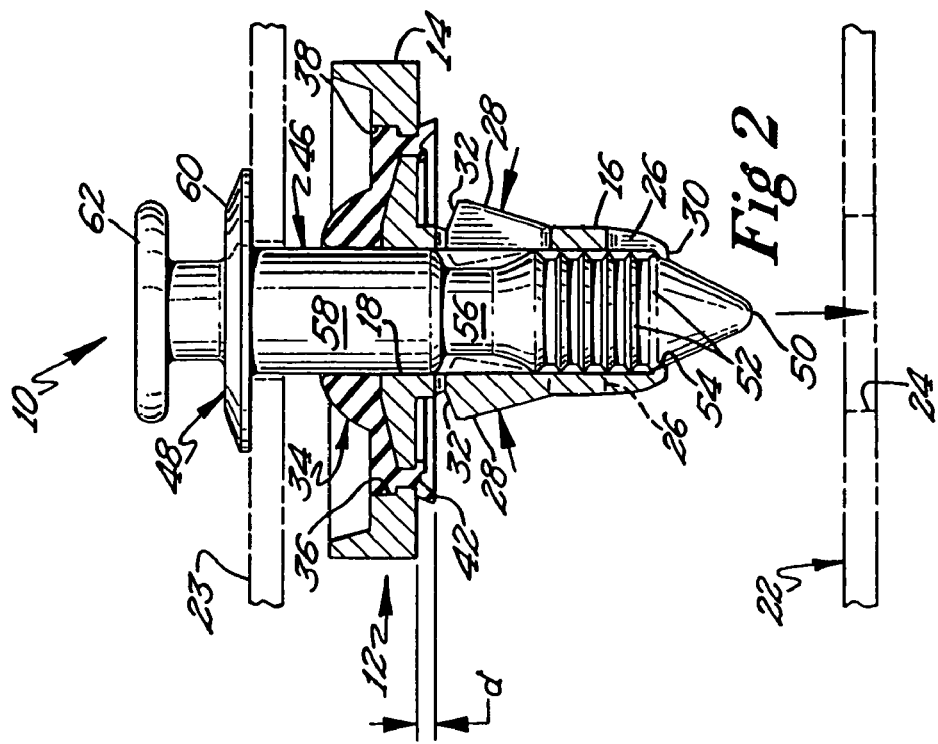
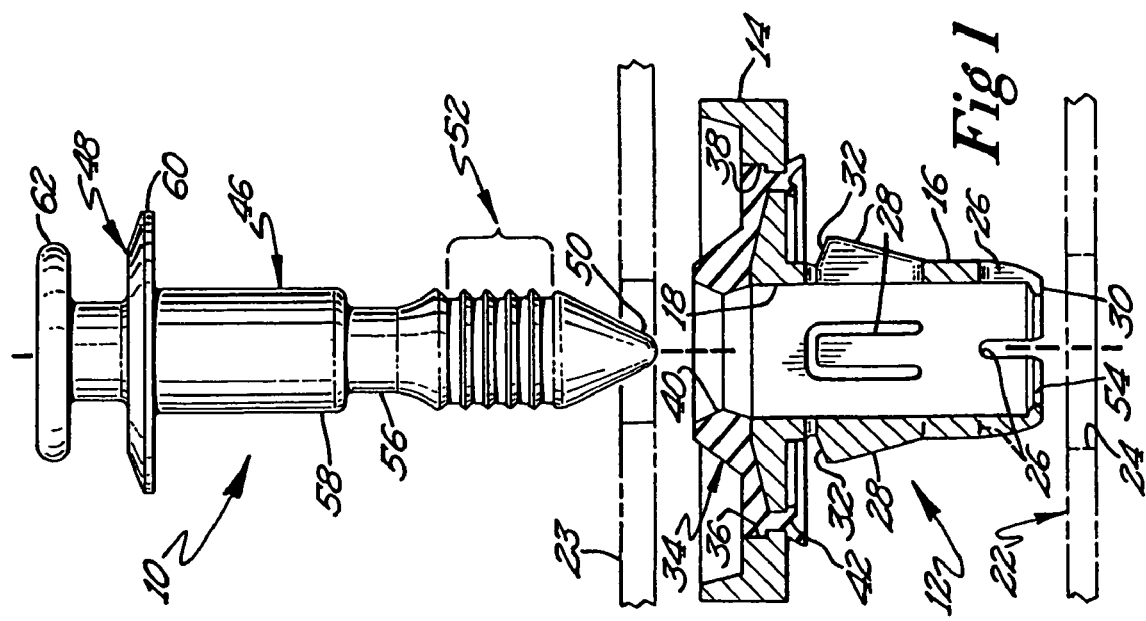

WATER-TIGHT GROMMET

CROSS REFERENCE TO RELATED APPLICATIONS

This application claims the benefit of U.S. Provisional Application Ser. No. 60/414,772 filed on Sep. 30, 2002 and entitled Water-Tight Grommet.

FIELD OF THE INVENTION

The present invention relates to fasteners in general and specifically to a watertight pin and grommet assembly.

SUMMARY OF THE INVENTION

Generally speaking, the present invention comprises a grommet adapted to be received and retained within a bore formed in, or through, a panel or other similar object. The grommet is in turn constructed and arranged to receive and retain therein a pin. The pin is constructed so as to be retained within the grommet while simultaneously capturing an object, typically a second panel, between a head of the pin and a head of the grommet. Alternatively, in a preferred arrangement, the head of the pin may be provided with structures that allow objects to be secured to the pin without the necessity of capturing the object between the head of the pin and the head of the grommet.

The grommet of the present invention is provided with a sealing mechanism that provides a substantially watertight seal between the grommet and the panel in which the grommet is received and a watertight seal between the grommet and the pin that is received in the grommet. Specifically, the sealing mechanism is formed integrally with the head of the grommet, preferably in an overmolding operation or two-shot process, such that the sealing mechanism forms a seal between the undersurface of the head of the grommet and the panel into which the grommet is received, while simultaneously forming a water-tight seal between the shaft of the pin and the interior of the grommet into which the pin is received.

In the preferred embodiment of the sealing mechanism, a portion of the sealing member extends downwardly and away from an undersurface of the head of the grommet entirely circumjacent to the shaft of the grommet. The sealing member may be a solid ridge running around the undersurface of the head of the grommet or may comprise one or more frustoconical wiper seals that create a watertight seal between the undersurface of the grommet head and the panel into which the grommet is received.

The sealing mechanism preferably simultaneously extends through and above the head of the grommet and into a bore formed entirely therethrough that is constructed and arranged for the receipt of a shaft of the pin. The portion of the sealing mechanism that extends into this bore will form an interference fit between the outer surface of the shaft of the pin and the sealing mechanism so as to create a watertight seal therebetween. Note also that the sealing mechanism may extend above the upper surface of the grommet so as to create a watertight seal between the head of the grommet and a panel or the undersurface of the head of the pin.

The pin and the grommet of the present invention are provided with a catchment mechanism that provides for the retention of the pin within the grommet. In the preferred embodiment, the pin is provided with a series of grooves or ridges that extend around the shaft of the pin while the body of the grommet is provided with a cooperative ridge or detent that is constructed and arranged to securely engage the ridges formed around the shaft of the pin such that pin may be securely engaged by the grommet in one or more positions. Note that the one or more positions of the pin allow a single pin and grommet design to accommodate diverse applications. It is to be understood that the catchment mechanism of the present invention may take many forms, some of which have not been disclosed herein; accordingly, the catchment mechanism of the present invention is not to be limited to the descriptions made in this specification.

DESCRIPTION OF THE DRAWINGS

FIG. 1 is an exploded cross-sectional view of a pin and grommet constructed according to the present invention; and FIG. 2 is a cross-sectional view of the invention wherein a pin is received within the grommet.

DETAILED DESCRIPTION OF THE INVENTION

FIG. 1 illustrates a pin 10 and a grommet 12 constructed according to the principles of the present invention. The pin 10 is constructed and arranged to be received within the grommet 12 as shown in FIG. 2.

The grommet 12 of the present invention is comprised of head 14 that has extending from an underside thereof a body 16. The body 16 of the grommet 12 extends away from the head 14 in a generally perpendicular fashion. The head 14 and body 16 of the grommet 12 define a bore 18 that extends entirely therethrough. The body 16 of the grommet 12 also comprises one or more retention structures 20 that act to retain the body 16 of the grommet 12 within a bore 24 formed into or through a panel or object 22. In a preferred embodiment of the present invention, the retention structures 20 comprise an aperture 26 that is formed through the wall of the body 16. A flexible retention tab 28 is disposed therein and is secured to a distal edge of the aperture 26 such that the tabs 28 extend away from the distal end 30 of the body 16 and toward the head 14. A bearing surface 32 of the tabs 28 is spaced apart from an undersurface of the head 14 by a distance d as shown in FIG. 2. The distance d determines the thickness of the object or panel 22 into which the grommet 12 may be securely received. Accordingly, it is to be understood that distance d may vary from application to application, and the grommet 12 is adapted and configured to accept panels with multiple thicknesses.

In use, as the body 16 of the grommet 12 is inserted into the bore 24, the tabs 28 will be deflected inwardly until such time as the bearing surface 32 of the tabs 28 have cleared the bore 24 or have otherwise been positioned such that the tabs 28 and the head 14 of the grommet 12 will securely engage opposing sides of the object or panel 22. In this way, the grommet 12 may be securely received within the object or panel 22. Note that the grommet 12 may be preassembled with the bore 24 at a location remote from that in which the object or panel 22 receives its final assembly.

The head 14 of the grommet 12 comprises a sealing mechanism that is constructed and arranged to simultaneously create seals between the undersurface of the head 14 and the object or panel 22 and between the bore 18 and the pin 10. In a preferred embodiment of the present invention, the sealing mechanism 34 is overmolded integrally with the grommet 12. In another embodiment (not shown) the sealing mechanism 34 may be formed entirely around the exterior of the head 14 of the grommet 12.

In the embodiment illustrated in FIGS. 1 and 2, the sealing mechanism 34 is overmolded into the head 14 of the grommet 12 by first forming a cavity 36 in or through the head 14 into which the sealing mechanism 34 can be received. Cavity 36 may take any suitable form but preferably comprises one or more bores 38 formed through the head 14 such that the sealing mechanism 34 can extend entirely therethrough. The cavity 36 is typically formed during a molding process when the grommet 12 is produced, though it is possible that the cavity 34 may be formed by machining or by other mechanical or chemical processes such a laser cutting or etching. In any case, in the preferred embodiment illustrated in FIGS. 1 and 2, an upper portion 40 of the sealing mechanism 34 extends at least partially into the bore 18 formed through the grommet 12. A lower portion 42 of the sealing mechanism 34 extends below a lower surface of the head 14 of the grommet 12. The upper portion 40 of the sealing mechanism 34 forms an interference fit with the pin 10 and substantially prevents water and other liquids from passing therebetween. The lower portion 42 of the sealing mechanism 34 forms a substantially water-tight seal between the head 14 of the grommet 12 and the object or panel 22 when the grommet 12 is fully received within the bore 24 formed in the object or panel 22.

In a preferred embodiment of the present invention, the lower portion 42 of the sealing mechanism 34 will form one or more wiper seals 44. As can be seen in FIG. 2, one embodiment of the sealing mechanism 34 includes an outer wiper seal 44a and an inner wiper seal 44b. The wiper seals 44 extend away from the undersurface of the head 14 of the grommet 12 and their generally resilient nature permits the formation of the substantially watertight seal described hereinabove. The wiper seals 44 may take any useful shape, but in the preferred embodiment form a generally frusto-conical lip that extends entirely around the head 14 of the grommet 12.

As can be seen in FIG. 2, the upper portion 40 of the sealing mechanism 34 forms a substantially watertight seal with the shaft 46 of the pin 10. In addition, because the upper portion 40 of the sealing mechanism 34 may also extend above the upper surface of the head 14, the sealing mechanism 34 may also form a watertight seal with a second object 23 or an undersurface of a head 48 of the pin 10.

As described hereinabove, the pin 10 is constructed and arranged to be received within the bore 18 of the grommet 12. The pin 10 has formed around the shaft 46 near its distal end 50 one or more ridges 52 that form one portion of a catchment mechanism for securing the pin 10 within the grommet 12. The distal end 30 of the grommet 12 is provided with an inwardly extending lip 54 that comprises the second portion of the catchment mechanism. Ridges 52 and lip 54 act cooperatively to secure the pin 10 within the grommet 12 in one or more positions defined by the number and spacing of the ridges 52. For example, and with reference to FIG. 2, where the lip 54 engages the ridge 52 nearest the distal end 50 of the pin 10, the maximum distance d will be achieved between the head 48 of the pin 10 and the upper surface of the head 14 of the grommet 12. By inserting the pin 10 farther into the grommet 12, the distance d between the head 48 of the pin 10 and the head 14 of the grommet 12 can be lessened so as to accommodate objects or panels 23 of varying thickness. Note that where the pin 10 is not used to capture an object or panel 23, the protrusion of the pin 10 from the grommet 12 may be controlled in this same manner. It is noted that the double head on the pin is usually snapped into some sort of associated panel (e.g., door panel, trim panel) that ratchets on the pin, thereby allowing the panel to be ratcheted to various stages as needed for a good fit.

Where the pin 10 is to be preassembled with the grommet 12 before the grommet 12 is inserted into a bore 24, it is usually desirable to provide the shaft 46 of the pin 10 with a channel 56 that cooperates with the retention mechanism 20 to ease the insertion of the grommet 12 into the bore 24. The channel 56 will be sized and positioned on the shaft 46 so as to be aligned generally with the tabs 28 of the retention mechanism 20. The channel 56 provides a clearance space for the tabs 28 as they are inwardly deflected as the grommet 12 is inserted into the bore 24. Note that if the grommet 12 is inserted into the bore 24 prior to the insertion of the pin 10 into the bore 18, the channel 56 may be omitted from the pin 10. Similarly, where the material from which the grommet 12 and specifically the tabs 28 are fashioned is sufficiently elastic as to allow the insertion of the grommet 12 into the bore 22 without requiring significant inward deflection, the dimensions of the channel 56 may be reduced, or the channel 56 may be omitted entirely.

The shaft 46 of the pin 10 is also provided with a generally cylindrical portion 58 that is engaged by the upper portion 40 of the sealing mechanism 34 so as to create a seal between the pin 10 and grommet 12. Note that the dimensions and shape of the portion 58 and of the shaft 46 in general are such that the upper portion 40 of the sealing mechanism 34 will always engage the portion 58 of the pin 10 when the ridges 52 are engaged by the lip 54. Note that the portion 58 may take other shapes than cylindrical, so long as a substantially watertight seal is maintained between the sealing mechanism 34 and the pin 10.

The head 48 of the pin 10 will in a preferred embodiment include at least a first head 60. The first head 60 acts to limit the insertion of the pin 10 into the bore 18 in that it will engage an object 23 or the upper surface of the head 14 of the grommet 12 so as to prevent the insertion of the pin 10 entirely into or through the bore 18. As can be seen in FIG. 2, the head 48 of the pin 10 may also be provided with a supplemental head 62, which may be used as a point of attachment for a myriad of structures or objects.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A substantially watertight grommet for use in securing a pin to a first object, the grommet comprising:

a head having an undersurface from which extends an elongate body, the body extending from the head in generally perpendicular relationship thereto, the head and the body defining therethrough a bore that is constructed and arranged to receive the pin; said head and said body being a single molded piece, wherein the head of the grommet includes a channel extending completely therethrough from an upper surface thereof to the undersurface thereof;

at least one retention structure coupled to the body, the retention structure being constructed and arranged with respect to the head of the grommet such that when the grommet is received within a bore formed in the first object, the head and the retention structure will engage opposing surfaces of the first object so as to securely retain the grommet within the bore formed therethrough;

a sealing mechanism overmolded to the head of the grommet that is constructed and arranged with a first portion thereof forming a substantially water-tight seal between an undersurface of the head and a surface of the first object and a second portion thereof forming a substantially water-tight seal between the pin and the bore defined by the head and body of the grommet, the sealing mechanism being further constructed and arranged such that an upper portion of the sealing mechanism extends at least partially into the bore defined by the head and body of the grommet so as to form an interference fit between the sealing mechanism and the pin, and such that the sealing mechanism first and second portions are joined together as a single molded component through the channel in the head of the grommet such that a portion of sealing mechanism is positioned above the upper surface of the head and a portion of the sealing mechanism is positioned below the undersurface of the head; and a catchment mechanism comprising a first portion formed into a shaft of the pin and a second portion formed into the body of the grommet, the first and second portions of the catchment mechanism being constructed and arranged to secure the pin within the grommet.

2. The watertight grommet of claim 1 wherein a lower portion of the sealing mechanism extends below an undersurface of the head of the grommet.

3. The watertight grommet of claim 2 wherein the lower portion of the sealing mechanism forms at least one circumferential seal.

4. The watertight grommet of claim 1 wherein the first portion of the catchment mechanism comprises at least one ridge formed circumjacent to the pin.

5. The watertight grommet of claim 1 wherein the catchment mechanism is constructed and arranged to secure the pin within the grommet in a plurality of positions.

6. The water-tight grommet of claim 1 wherein the catchment mechanism comprises a detent formed upon an exterior surface of the pin such that when the pin is fully inserted into the bore defined by the body and head of the grommet, that portion of the pin having the detent formed thereon will protrude beyond a distal end of the body of the grommet, the detent acting to prevent withdrawal of the pin from the grommet.

7. The water-tight grommet of claim 1 wherein the head of the grommet has at least one part configured for receiving the sealing mechanism overmolded integrally with the head of the grommet.

8. The water-tight grommet of claim 1 wherein the sealing mechanisms is further configured such that a portion of the sealing mechanism extends above the upper surface of the head of the grommet so as to be adapted to seal with a second object.

9. The watertight grommet of claim 1, wherein the arrangement of the pin and the retention structure is such that the pin is provided with a reduced diameter portion to provide a clearance space for the retention structure as the retention structure is inwardly deflected when the grommet is inserted into the bore formed in the first object.

10. The watertight grommet of claim 1, wherein the pin is configured such that the catchment mechanism of the pin is positioned adjacent to a tip thereof that is spaced apart from a head of the pin such that the reduced diameter portion of the pin is located intermediate of the head of the pin and the catchment mechanism of the pin.

* * * * *